(12) United States Patent
Yamada et al.

(10) Patent No.: US 9,520,806 B2
(45) Date of Patent: Dec. 13, 2016

(54) POWER SUPPLY DEVICE FOR SUPPLYING POWER TO A LOAD BY COMBINING A SECONDARY BATTERY AND A CAPACITOR

(71) Applicant: VOLVO TRUCK CORPORATION, Gothenburg (SE)

(72) Inventors: Yoshiaki Yamada, Saitama (JP); Takayuki Tsuchiya, Saitama (JP); Kunihiko Hikiri, Saitama (JP); Kouichi Itani, Saitama (JP); Noriaki Miyake, Saitama (JP)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 14/649,616

(22) PCT Filed: Dec. 4, 2012

(86) PCT No.: PCT/JP2012/081327
§ 371 (c)(1),
(2) Date: Jun. 4, 2015

(87) PCT Pub. No.: WO2014/087475
PCT Pub. Date: Jun. 12, 2014

(65) Prior Publication Data
US 2015/0326066 A1    Nov. 12, 2015

(51) Int. Cl.
*H02M 7/537* (2006.01)
*H02M 7/5387* (2007.01)
(Continued)

(52) U.S. Cl.
CPC ............. *H02M 7/5387* (2013.01); *B60L 7/14* (2013.01); *B60L 11/005* (2013.01); *B60L 11/1803* (2013.01); *B60L 11/1861* (2013.01); *B60L 11/1868* (2013.01); *B60L 15/007* (2013.01); *H01M 10/44* (2013.01); *H01M 16/00* (2013.01);
(Continued)

(58) Field of Classification Search
CPC ............. H02M 2001/0083; H02M 2001/0067; H02M 2007/4803; H02M 7/537; H02M 7/5837
See application file for complete search history.

(56) References Cited

U.S. PATENT DOCUMENTS

| | | | |
|---|---|---|---|
| 7,649,335 B2 | 1/2010 | Ishikawa et al. | |
| 2012/0057373 A1* | 3/2012 | Liu | H02M 3/155 363/21.1 |
| 2014/0203634 A1* | 7/2014 | Sugiyama | B60L 1/00 307/10.1 |

FOREIGN PATENT DOCUMENTS

| | | |
|---|---|---|
| JP | 2002118974 A | 4/2002 |
| JP | 2003143713 A | 5/2003 |

(Continued)

*Primary Examiner* — Fred E Finch, III
*Assistant Examiner* — Rafael O De León Domenech
(74) *Attorney, Agent, or Firm* — Laurence A. Greenberg; Werner H. Stemer; Ralph E. Locher

(57) ABSTRACT

A power supply device for supplying power to a load by combining a secondary battery and a capacitor connected in parallel to the secondary battery includes an insulation type DC-DC converter with a primary coil connected in parallel to the secondary battery and configured to accumulate energy by a current supplied from the secondary battery and a secondary coil connected in series to the capacitor and configured such that an induction current flows therein by the accumulated energy from the primary coil.

3 Claims, 5 Drawing Sheets

(51) Int. Cl.
*H02J 7/34* (2006.01)
*H01M 10/44* (2006.01)
*H02M 3/335* (2006.01)
*H01M 16/00* (2006.01)
*B60L 7/14* (2006.01)
*B60L 11/00* (2006.01)
*B60L 11/18* (2006.01)
*B60L 15/00* (2006.01)
*H02M 1/00* (2006.01)
*H02M 7/48* (2007.01)
*H02J 7/00* (2006.01)

(52) U.S. Cl.
CPC ............ *H02J 7/345* (2013.01); *H02M 3/335* (2013.01); *H02M 7/537* (2013.01); *B60L 2210/10* (2013.01); *B60L 2240/547* (2013.01); *B60L 2240/549* (2013.01); *H01M 2220/20* (2013.01); *H02J 7/0065* (2013.01); *H02M 2001/0067* (2013.01); *H02M 2001/0083* (2013.01); *H02M 2001/0093* (2013.01); *H02M 2007/4803* (2013.01); *Y02T 10/645* (2013.01); *Y02T 10/7005* (2013.01); *Y02T 10/7022* (2013.01); *Y02T 10/7044* (2013.01); *Y02T 10/7066* (2013.01); *Y02T 10/7216* (2013.01); *Y10T 307/527* (2015.04)

(56) References Cited

FOREIGN PATENT DOCUMENTS

| JP | 2006345606 A | 12/2006 | |
|---|---|---|---|
| JP | 2010233419 A | 10/2010 | |
| JP | 2010273428 A | 12/2010 | |
| WO | WO 2012140746 A1 * | 10/2012 | ................ B60L 1/00 |

* cited by examiner

POWER SUPPLY DEVICE FOR SUPPLYING POWER TO A LOAD BY COMBINING A SECONDARY BATTERY AND A CAPACITOR

TECHNICAL FIELD

The present invention relates to a power supply device for supplying power to a load.

BACKGROUND ART

Conventionally, a power supply device for supplying power to a load by combining a battery and a capacitor has been used. JP2006-345606A discloses a power supply system for vehicle in which a battery and a capacitor are connected in parallel. In this power supply system, an inverter for an electric motor is driven by electrical energy supplied from the capacitor and the battery.

SUMMARY OF INVENTION

However, in the power supply system of JP2006-345606A, the motor can be no longer driven by the electrical energy from the capacitor if a voltage of the capacitor drops below a voltage capable of driving the inverter. Further, unlike a secondary battery in which a voltage moderately decreases during discharge, the capacitor has a characteristic that a voltage linearly decreases during discharge. Thus, if the voltage of the capacitor drops, the inverter cannot be driven by the supply of the electrical energy from the capacitor despite the remaining electrical energy.

The present invention was developed in view of the above problem and aims to effectively utilize electrical energy of a capacitor.

According to one aspect of the present invention, a power supply device configured to supply power to a load by combining a secondary battery and a capacitor connected in parallel to the secondary battery, the power supply device includes an insulation type DC-DC converter including a primary coil and a secondary coil, the primary coil being connected in parallel to the secondary battery, the primary coil being configured to accumulate energy by a current supplied from the secondary battery, the secondary coil being connected in series to the capacitor, the secondary coil being configured such that an induction current flows therein by the accumulated energy from the primary coil.

The details as well as other features and advantages of this invention are set forth in the remainder of the specification and are shown in the accompanying drawings.

DESCRIPTION OF EMBODIMENTS

Hereinafter, embodiments of the present invention are described with reference to the drawings.

First Embodiment

Figure 1:
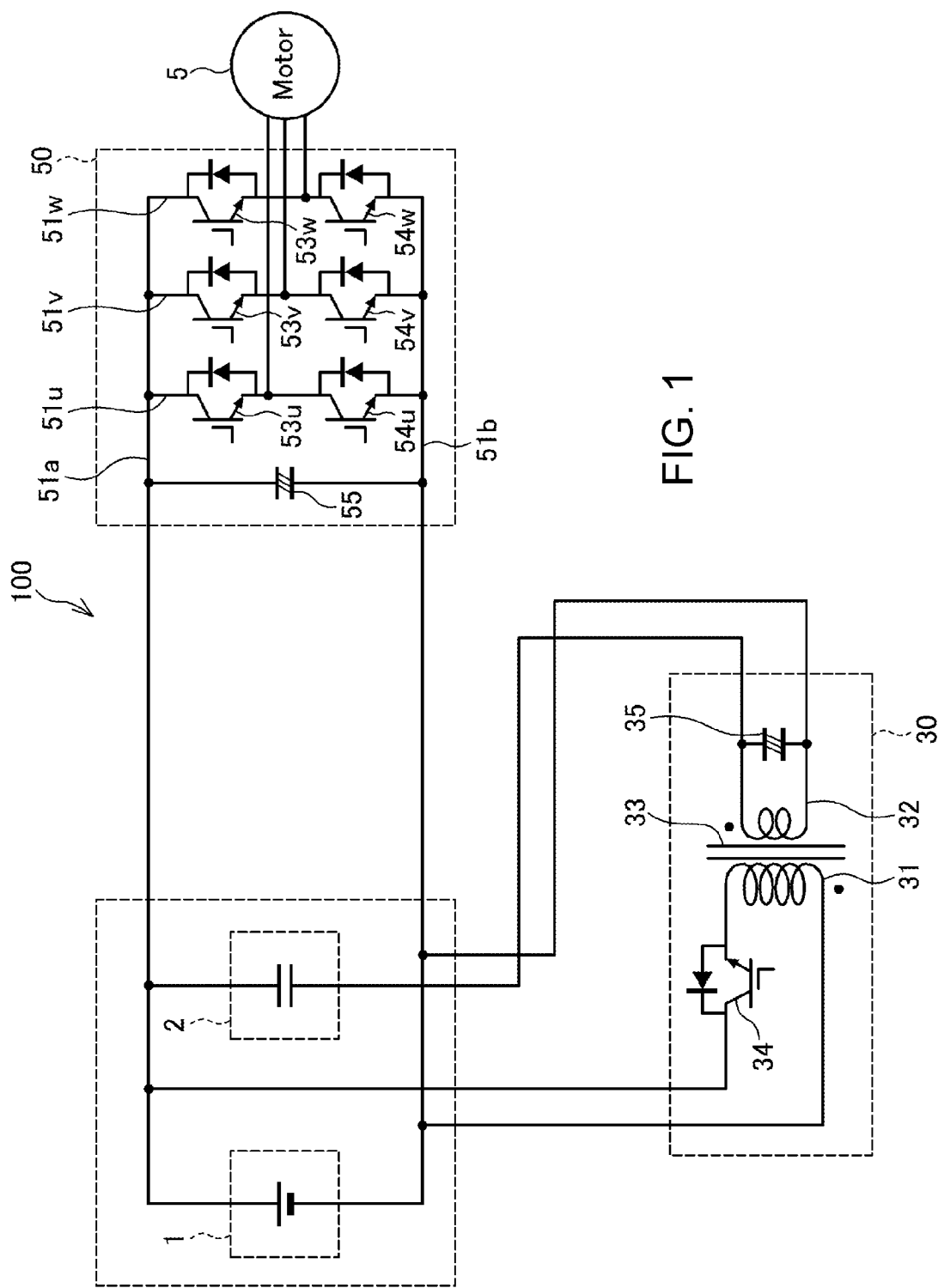
FIG. 1 is an electrical circuit diagram of a power supply device according to a first embodiment of the present invention.
Figure 2:
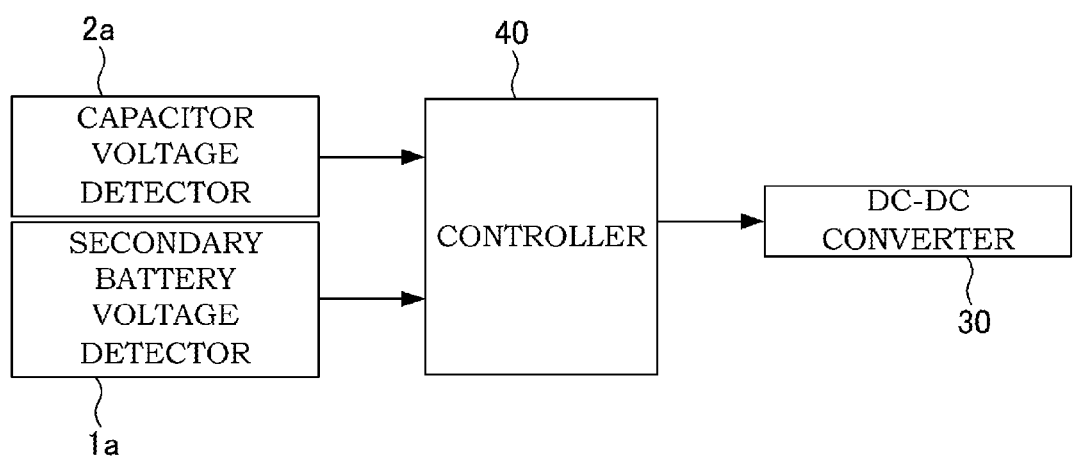
FIG. 2 is a block diagram of the power supply device according to the first embodiment of the present invention.

A power supply device 100 according to a first embodiment of the present invention is described below with reference to FIGS. 1 and 2.

The power supply device 100 supplies power to a load by combining a secondary battery 1 and a capacitor 2 connected in parallel to the secondary battery 1. The load is an inverter 50 for driving an electric motor 5 by the supply of power from the secondary battery 1 and the capacitor 2. The power supply device 100 is applied to an HEV (Hybrid Electric Vehicle), an EV (Electric Vehicle) and the like.

First, the inverter 50 to which power is supplied from the power supply device 100 and the electric motor 5 to be driven by the inverter 50 are described.

The electric motor 5 is a drive motor mounted in an HEV or an EV. The electric motor 5 is a three-phase induction motor generator which is driven by a rotating magnetic field generated by a three-phase alternating current. The electric motor 5 is provided with a stator including a plurality of coils (not shown) constituting each of a U-phase, a V-phase and a W-phase on an inner periphery and a rotator including a permanent magnet and configured to rotate on the inner periphery of the stator. The electric motor 5 is such that the stator is fixed to a vehicle body (not shown) and a rotary shaft of the rotator is coupled to an axle of wheels (not shown). The electric motor 5 can convert electrical energy into the rotation of the wheels and can convert the rotation of the wheels into electrical energy.

The inverter 50 is a voltage-to-current converter for generating alternating current power from direct current power supplied from the secondary battery 1 and the capacitor 2. The inverter 50 has a rated voltage of 600 V and a drivable minimum voltage of 300 V. This minimum voltage corresponds to a minimum voltage capable of driving the load.

The inverter 50 converts the direct current power supplied from the secondary battery 1 and the capacitor 2 into a three-phase alternating current composed of a U-phase, a V-phase and a W-phase shifted at an interval of 120° and supplies it to the electric motor 5.

The inverter 50 includes a positive-side power line 51a, a negative-side power line 51b, a U-phase power line 51u, a V-phase power line 51v and a W-phase power line 51w. The positive-side power line 51a is connected to positive electrodes of the secondary battery 1 and the capacitor 2. The negative-side power line 51b is connected to negative electrodes of the secondary battery 1 and the capacitor 2. The U-phase power line 51u, the V-phase power line 51v, and the W-phase power line 51w are provided between the positive-side power line 51a and the negative-side power line 51b. Further, a smoothing condenser 55 for smoothing a voltage of a direct current transferred between the secondary battery 1, the capacitor 2, and the inverter 50 is connected in parallel between the positive-side power line 51a and the negative-side power line 51b.

The inverter 50 includes IGBTs (Insulated Gate Bipolar Transistors) 53u, 54u, 53v, 54v, 53w and 54w as six switching elements. These IGBTs 53u to 54w are each an IGBT with a rectifying diode connected in parallel in an opposite direction.

The IGBT 53u and the IGBT 54u are provided in series in the U-phase power line 51u. The U-phase power line 51u between the IGBT 53u and the IGBT 54u is connected to the coil constituting the U-phase of the electric motor 5. The IGBT 53v and the IGBT 54v are provided in series in the V-phase power line 51v. The V-phase power line 51v between the IGBT 53v and the IGBT 54v is connected to the coil constituting the V-phase of the electric motor 5. The IGBT 53w and the IGBT 54w are provided in series in the W-phase power line 51w. The W-phase power line 51w between the IGBT 53w and the IGBT 54w is connected to the coil constituting the W-phase of the electric motor 5.

The inverter 50 generates an alternating current to drive the electric motor 5 by the IGBTs 53u, 54u, 53v, 54v, 53w and 54w being controlled by a motor controller (not shown).

Next, the configuration of the power supply device 100 is described.

The power supply device 100 includes the secondary battery 1, the capacitor 2, an insulation type DC-DC converter (hereinafter, merely referred to as a "DC-DC converter") 30 for applying a bias voltage to the capacitor 2 by utilizing electrical energy of the secondary battery 1, and a controller 40 (see FIG. 2) for controlling the DC-DC converter 30.

The secondary battery 1 is a chemical battery such as a lithium ion secondary battery or a nickel hydrogen secondary battery. Here, a voltage of the secondary battery 1 is set at 600 V. The secondary battery 1 includes a secondary battery voltage detector 1a (see FIG. 2) for detecting a voltage and transmitting a corresponding signal to the controller 40.

The capacitor 2 is an electric double-layer capacitor in which a plurality of capacitor cells are connected in series and set at a desired voltage and a plurality of capacitor cells are connected in parallel and set at a desired storage capacity. Here, a voltage of the capacitor 2 is set at 300 V. The capacitor 2 includes a capacitor voltage detector 2a (see FIG. 2) for detecting a voltage and transmitting a corresponding signal to the controller 40.

The DC-DC converter 30 includes a primary coil 31 connected in parallel to the secondary battery 1, a secondary coil 32 connected in series to the capacitor 2, a transformer core 33 for accumulating energy by a current flowing in the primary coil 31, an IGBT 34 as a switching element provided in series to the primary coil 31, and a smoothing condenser 35 connected in parallel to the secondary coil 32. The DC-DC converter 30 is a flyback converter for adjusting an output voltage to be output from the secondary coil 32 so that the sum of the output voltage and the voltage of the capacitor 2 becomes a set voltage.

A current from the secondary battery 1 is directly supplied to the primary coil 31. The current intermittently flows into the primary coil 31 by the IGBT 34 being switched by the controller 40. The primary coil 31 accumulates energy in the transformer core 33 by the current supplied from the secondary battery 1.

The transformer core 33 is magnetized by the current flowing in the primary coil 31 when the IGBT 34 is switched on. In this way, magnetic energy is accumulated in the transformer core 33. The magnetic energy accumulated in the transformer core 33 is converted into an induction current flowing in the secondary coil 32 when the IGBT 34 is switched off.

The induction current flows into the secondary coil 32 from the primary coil 31 by the energy accumulated in the transformer core 33. The induction current having a lower voltage than that of the secondary battery 1 flows into the secondary coil 32. That is, the DC-DC converter 30 is a step-down converter.

The IGBT 34 is chopper-controlled by the controller 40. The IGBT 34 adjusts the voltage of the induction current flowing in the secondary coil 32 by changing a duty ratio of a chopper control. The induction current flowing in the secondary coil 32 has a higher voltage as the duty ratio of the IGBT 34 becomes higher.

The smoothing condenser 35 smoothes the voltage of the induction current intermittently flowing in the secondary coil 32 by the chopper control of the IGBT 34. In this way, the induction current flowing in the secondary coil 32 becomes a direct current having a substantially constant voltage.

The controller 40 (see FIG. 2) controls the power supply device 100. The controller 40 is a microcomputer with a CPU (Central Processing Unit), a ROM (Read-Only Memory), a RAM (Random Access Memory), and an I/O interface (Input/Output interface). The RAM stores data in the process of the CPU. The ROM stores a control program of the CPU and the like in advance. The I/O interface is used to input and output information from and to a connected device. By operating the CPU, the RAM and the like in accordance with the program stored in the ROM, the control of the power supply device 100 is realized.

The controller 40 controls the DC-DC converter 30 to adjust an output voltage to be output from the secondary coil 32 so that the sum of the output voltage and the voltage of the capacitor 2 becomes equal to the voltage of the secondary battery 1. This voltage of the current to be output from the secondary coil 32 corresponds to the set voltage. In this way, the following control is possible in the power supply device 100.

Next, functions of the power supply device 100 are described.

When the secondary battery 1 and the capacitor 2 are both fully charged, the controller 40 controls the DC-DC converter 30 to step down the voltage of the secondary battery 1 to 300 V and apply a bias voltage to the capacitor 2 from the secondary coil 32. In this way, the sum of the voltage of the capacitor 2 and the bias voltage becomes 600 V and becomes equal to the voltage of the secondary battery 1. Thus, the electric motor 5 can be driven by supplying power to the inverter 50 from the secondary battery 1 and the capacitor 2.

When the electric motor 5 is driven by supplying power to the inverter 50 from the capacitor 2, the voltage of the capacitor 2 proportionally drops. At this time, the controller 40 controls the DC-DC converter 30 to step down the voltage of the secondary battery 1 to a voltage higher than 300 V by a voltage drop of the capacitor 2.

Specifically, if the voltage of the capacitor 2 drops, for example, to 250 V, the controller 40 controls the DC-DC converter 30 to step down the voltage of the secondary battery 1 from 600 V to 350 V and apply a bias voltage to the capacitor 2 from the secondary coil 32. In this way, the sum of the voltage of the capacitor 2 and the bias voltage becomes 600 V and becomes equal to the voltage of the secondary battery 1. Thus, also in this case, the electric motor 5 can be driven by supplying power to the inverter 50 from the secondary battery 1 and the capacitor 2.

If the supply of power to the inverter 50 by the secondary battery 1 and the capacitor 2 continues, the voltage of the capacitor 2 drops and approaches 0 V. At this time, the controller 40 controls the DC-DC converter 30 to apply a bias voltage of approximately 600 V to the capacitor 2 from the secondary coil 32 while hardly stepping down the voltage of the secondary battery 1. In this way, the sum of the voltage of the capacitor 2 and the bias voltage can be set at 600 V. Thus, the electric motor 5 can be driven by supplying power to the inverter 50 until the voltage of the capacitor 2 becomes substantially 0 V.

Conventionally, it has not been possible to drive the inverter 50 by utilizing electrical energy of the capacitor 2 although the electrical energy remains in the capacitor 2 if the voltage of the capacitor 2 drops below the minimum voltage capable of driving the inverter 50. Since the minimum voltage capable of driving the inverter 50 is 300 V, it has not been possible to drive the inverter 50 by using the electrical energy of the capacitor 2 if the voltage of the capacitor 2 drops below 300 V.

Contrary to this, in the power supply device 100, a bias voltage can be applied to the capacitor 2 from the secondary battery 1 by controlling the DC-DC converter 30 when the voltage of the capacitor 2 drops. Thus, the electric motor 5 can be driven by supplying the electrical energy remaining in the capacitor 2 to the inverter 50 by increasing an apparent voltage by the bias voltage even if the voltage of the capacitor 2 drops. Therefore, the electrical energy of the capacitor 2 can be effectively utilized.

Further, since the electrical energy of the capacitor 2 can be effectively utilized, the capacity of the capacitor 2 necessary to output the same electrical energy to the inverter 50 can be reduced. Thus, the capacitor 2 can be reduced in size and weight. Specifically, as compared with the case where a capacitor of 600 V is used until a voltage drops to 300 V, the capacitor 2 can output equivalent electrical energy with a capacity smaller by about 25%. Thus, the weight and installation space of the capacitor 2 are reduced by about 25% and cost can be reduced by that much.

According to the above first embodiment, the following effects are exhibited.

When the voltage of the capacitor 2 drops, the bias voltage can be applied to the capacitor 2 from the secondary battery 1 by the DC-DC converter 30. Thus, even if the voltage of the capacitor 2 drops, the electric motor 5 can be driven by supplying the electrical energy remaining in the capacitor 2 to the inverter 50 by increasing the apparent voltage by the bias voltage. Therefore, the electrical energy of the capacitor 2 can be effectively utilized.

Second Embodiment

Figure 3:
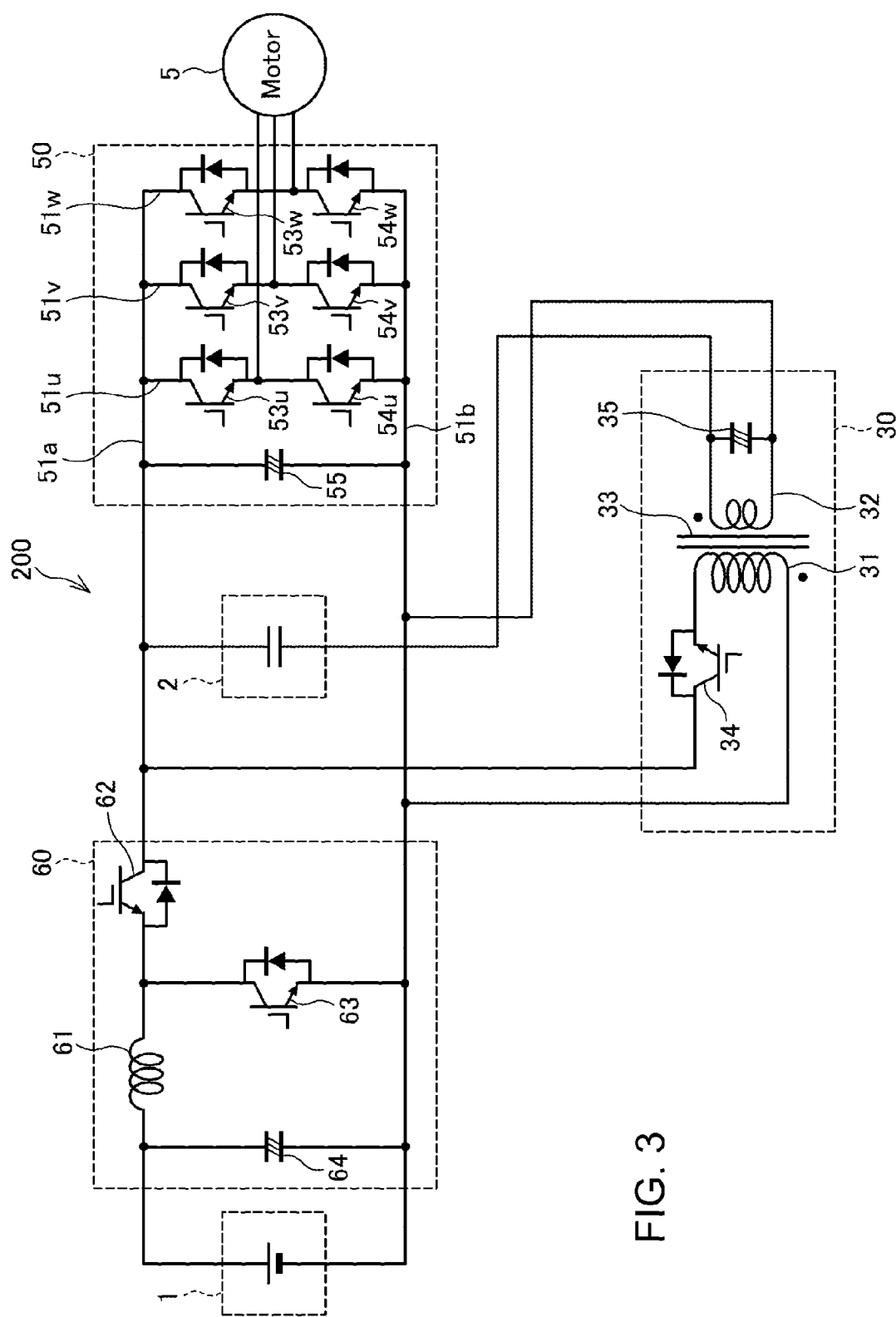
FIG. 3 is an electrical circuit diagram of a power supply device according to a second embodiment of the present invention.
Figure 4:
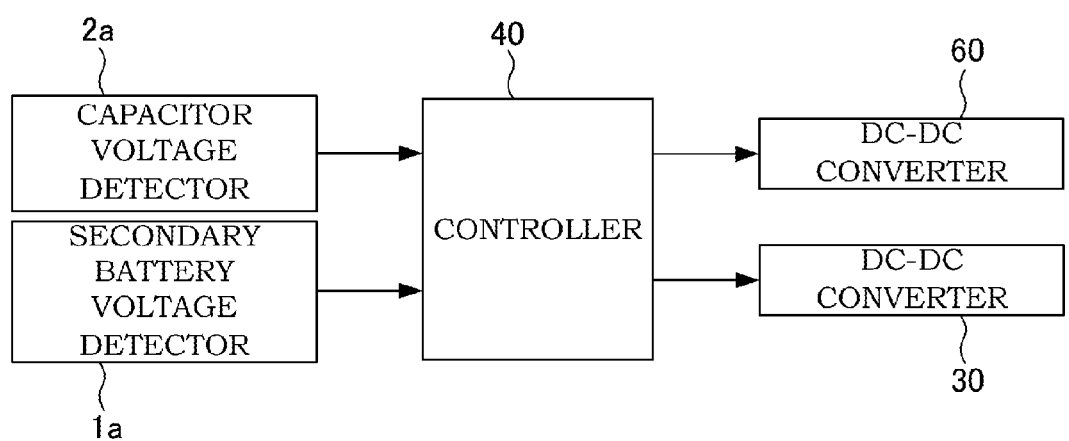
FIG. 4 is a block diagram of the power supply device according to the second embodiment of the present invention.

A power supply device 200 according to a second embodiment of the present invention is described below with reference to FIGS. 3 and 4. It should be noted that, in each of the following embodiments, components similar to those of the aforementioned embodiment are denoted by the same reference signs and repeated description is omitted as appropriate.

The second embodiment differs from the first embodiment in including a non-insulation type DC-DC converter (hereinafter, merely referred to as a "DC-DC converter") 60 capable of supplying a current to an inverter 50 by stepping up a voltage of a secondary battery 1.

The power supply device 200 supplies power to the inverter 50 by combining the secondary battery 1 and a capacitor 2 connected in parallel to the secondary battery 1.

The power supply device 200 is provided with the secondary battery 1, the capacitor 2, the DC-DC converter 60 capable of supplying a current to the inverter 50 by stepping up a voltage of the secondary battery 1, a DC-DC converter 30 for applying a bias voltage to the capacitor 2 by utilizing electrical energy of the secondary battery 1, and a controller 40 (see FIG. 4) for controlling the DC-DC converters 60 and 30.

The DC-DC converter 60 can supply power to the inverter 50 by stepping up the voltage of the secondary battery 1 and can step down regenerative power from the inverter 50 and charge it into the secondary battery 1. The DC-DC converter 60 includes a reactor 61 provided downstream of the secondary battery 1, a step-down control transistor 62 provided between the reactor 61 and an upstream side of an electric motor 5, a step-up control transistor 63 provided between the reactor 61 and a downstream side of the electric motor 5, and a smoothing condenser 64 connected in parallel to the secondary battery 1.

The reactor 61 accumulates energy when the step-up control transistor 63 is on. When the step-up control transistor 63 is turned off, an induced electromotive force by the voltage input from the secondary battery 1 and the energy accumulated in the reactor 61 is output. In this way, the reactor 61 can step up and output the input voltage by the switching of the step-up control transistor 63.

The step-up control transistor 63 is switched by the controller 40. The step-up control transistor 63 is an IGBT with a rectifying diode connected in parallel in an opposite direction. The step-up control transistor 63 can step up a supply voltage to be supplied to the electric motor 5 by the induced electromotive force by switching a current of the reactor 61.

When the step-up control transistor 63 is switched on, a current from a positive electrode of the secondary battery 1 flows to a negative electrode of the secondary battery 1 by way of the reactor 61 and the step-up control transistor 63. By this current loop, energy is accumulated in the reactor 61.

The step-down control transistor 62 is switched by the controller 40. The step-down control transistor 62 is an IGBT with a rectifying diode connected in parallel in an opposite direction. The step-down control transistor 62 can step down a charge voltage from the electric motor 5 by switching. The step-down control transistor 62 steps down the power generated by the electric motor 5 by a chopper control and charges it into the secondary battery 1.

The smoothing condenser 64 smoothes a voltage output by the chopper control of the step-down control transistor 62. In this way, a voltage when the power generated by the electric motor 5, is charged into the secondary battery 1 and can be smoothed and stabilized.

The DC-DC converter 30 includes a primary coil 31 connected in parallel to the secondary battery 1, a secondary coil 32 connected in series to the capacitor 2, a transformer core 33 for accumulating energy by a current flowing in the primary coil 31, an IGBT 34 as a switching element provided in series to the primary coil 31, and a smoothing condenser 35 connected in parallel to the secondary coil 32. The DC-DC converter 30 is similar to that of the first embodiment. Here, the configuration of the DC-DC converter 30 is not described in detail.

A current of the secondary battery 1 stepped up by the DC-DC converter 60 is directly supplied to the primary coil 31. Thus, the magnitude of a bias voltage applied to the capacitor 2 from the secondary coil 32 is adjusted by a coordinated control of the DC-DC converters 30 and 60. Therefore, the magnitude of the bias voltage applied to the capacitor 2 from the secondary coil 32 can be more finely adjusted.

According to the above second embodiment, when the voltage of the capacitor 2 drops, the bias voltage can be applied to the capacitor 2 from the secondary battery 1 by the coordinated control of the DC-DC converters 30, 60. Thus, as in the first embodiment, the electric motor 5 can be driven by supplying the electrical energy remaining in the capacitor 2 to the inverter 50 by increasing an apparent voltage by the bias voltage even if the voltage of the capacitor 2 drops. Therefore, the electrical energy of the capacitor 2 can be effectively utilized.

Further, by providing the DC-DC converter 60 capable of supplying a current to the inverter 50 by stepping up the voltage of the secondary battery 1, it is possible to use the secondary battery 1 having a lower voltage as compared with the first embodiment. Thus, the weight and installation space of the capacitor 2 are reduced, the weight and installation space of the secondary battery 1 are also reduced and cost can be reduced by that much.

It should be noted that, at the time of braking a vehicle, the electrical energy generated by the electric motor 5 is first charged into the capacitor 2. When the capacitor 2 is fully charged, the controller 40 operates the DC-DC converter 60 to step down the electrical energy generated by the electric motor 5 and charge it into the secondary battery 1. At this time, since the voltage and the current can be adjusted to those suitable for the charging of the secondary battery 1, the secondary battery 1 can be efficiently charged.

Third Embodiment

Figure 5:
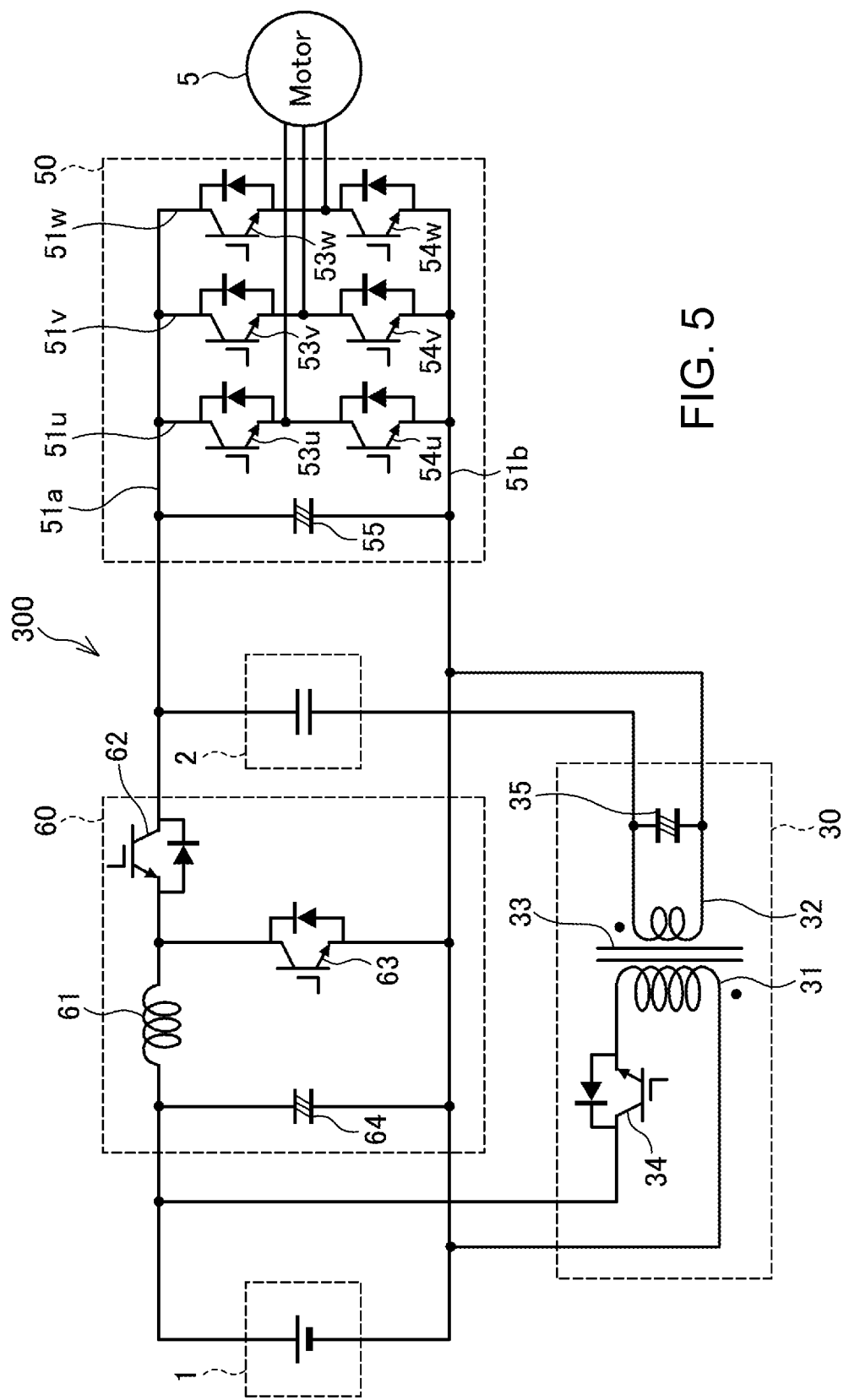
FIG. 5 is an electrical circuit diagram of a power supply device according to a third embodiment of the present invention.

A power supply device 300 according to a third embodiment of the present invention is described below with reference to FIG. 5.

The third embodiment is common to the second embodiment in including a DC-DC converter 60, but differs therefrom in that a current from a secondary battery 1 is directly supplied to a primary coil 31.

The power supply device 300 supplies power to an inverter 50 by combining the secondary battery 1 and a capacitor 2 connected in parallel to the secondary battery 1.

The power supply device 300 is provided with the secondary battery 1, the capacitor 2, the DC-DC converter 60 capable of supplying a current to the inverter 50 by stepping up a voltage of the secondary battery 1, a DC-DC converter 30 for applying a bias voltage to the capacitor 2 by utilizing electrical energy of the secondary battery 1 and a controller 40 (see FIG. 4) for controlling the DC-DC converters 60 and 30.

The current of the secondary battery 1 is directly supplied to the primary coil 31 without the DC-DC converter 60. This enables the following control to be executed in the power supply device 300.

Next, functions of the power supply device 300 are described.

In the case of supplying power to the inverter 50 from the capacitor 2 in a state where the capacitor 2 is fully charged, the controller 40 sets both the DC-DC converter 60 and the DC-DC converter 30 to a non-operational state. In this way, power is supplied to the inverter 50 from the capacitor 2 to drive the electric motor 5.

When the electric motor 5 is driven by supplying power to the inverter 50 from the capacitor 2, the voltage of the capacitor 2 proportionally drops. At this time, the controller 40 controls the DC-DC converter 30 to apply a bias voltage to the capacitor 2 from the secondary coil 32, while the DC-DC converter 60 is kept in the non-operational state. In this way, even if the voltage of the capacitor 2 drops, the electric motor 5 can be driven by supplying electrical energy remaining in the capacitor 2 to the inverter 50 by increasing an apparent voltage by the bias voltage. Thus, the electrical energy of the capacitor 2 can be effectively utilized.

On the other hand, in the case of supplying power to the inverter 50 from the secondary battery 1, the controller 40 executes a control to step up the DC-DC converter 60, while the DC-DC converter 30 is kept in the non-operational state. In this way, the electric motor 5 can be driven by stepping up the voltage of the secondary battery 1 and supplying it to the inverter 50. It should be noted that, at this time, the voltage of the secondary battery 1 needs to be stepped up to be equal to that of the capacitor 2 by controlling the DC-DC converter 60.

If the voltage of the capacitor is not sufficiently high, power is supplied to the inverter 50 from the secondary battery 1 by controlling the DC-DC converter 60 and the bias voltage is applied to the capacitor 2 from the secondary coil 32 by controlling the DC-DC converter 30. This prevents the power to be supplied to the inverter 50 from the secondary battery 1 from being charged into the capacitor 2 without being supplied to the inverter 50.

According to the above third embodiment, when the voltage of the capacitor 2 drops, the bias voltage can be applied to the capacitor 2 from the secondary battery 1 by the DC-DC converter 30. Thus, as in the first and second embodiments, the electric motor 5 can be driven by supplying the electrical energy remaining in the capacitor 2 to the inverter 50 by increasing an apparent voltage by the bias voltage even if the voltage of the capacitor 2 drops. Therefore, the electrical energy of the capacitor 2 can be effectively utilized.

Further, by providing the DC-DC converters 60 and 30, it is possible both to supply power to the inverter 50 only from the secondary battery 1 and to supply power to the inverter 50 only from the capacitor 2.

Embodiments of this invention were described above, but the above embodiments are merely examples of applications of this invention, and the technical scope of this invention is not limited to the specific constitutions of the above embodiments.

For example, numerical values such as those of the voltages in the aforementioned embodiments are illustrative and there is no limitation to these numerical values.

Further, in the aforementioned embodiments, the power supply device 100, 200, 300 is controlled by the controller 40 and the inverter 50 is controlled by the motor controller (not shown). Instead of this, the power supply device 100, 200, 300 and the inverter 50 may be controlled by a single controller.

Further, each of the aforementioned IGBTs is an IGBT with a rectifying diode connected in parallel in an opposite direction. Instead of this, an IGBT incorporating no diode and a rectifying diode connected in parallel to the IGBT in an opposite direction may be separately provided. Further, instead of IGBTs, other transistors such as MOSFETs (Metal-Oxide-Semiconductor Field-Effect Transistors) may be used as switching elements.

The embodiments of this invention in which an exclusive property or privilege is claimed are defined as follows:

The invention claimed is:

1. A power supply device configured to supply power to a load by combining a secondary battery and a capacitor connected in parallel to the secondary battery, the power supply device comprising:

an insulation type DC-DC converter including a primary coil and a secondary coil, the primary coil being connected in parallel to the secondary battery, the primary coil being configured to accumulate energy by a current supplied from the secondary battery, the secondary coil being connected in series to the capacitor, the secondary coil being configured such that an induction current flows therein by the accumulated energy from the primary coil;

wherein a current from the secondary battery is directly supplied to the primary coil and the insulation type DC-DC converter is configured to adjust an output voltage to be output from the secondary coil so that a sum of the output voltage and a voltage of the capacitor becomes equal to a voltage of the secondary battery.

2. The power supply device according to claim 1, wherein:

the insulation type DC-DC converter is a flyback converter, the flyback converter being configured to adjust an output voltage to be output from the secondary coil so that the sum of the output voltage and a voltage of the capacitor becomes a set voltage.

3. The power supply device according to claim 1, wherein:

the load is an inverter configured to drive an electric motor by the supply of power from the secondary battery and the capacitor.

\* \* \* \* \*